(12) United States Patent
Mushtaq et al.

(10) Patent No.: US 8,954,867 B2
(45) Date of Patent: Feb. 10, 2015

(54) SYSTEM AND METHOD FOR GATHERING PRODUCT, SERVICE, ENTITY AND/OR FEATURE OPINIONS

(75) Inventors: Faisal Mushtaq, Pleasanton, CA (US); Gavin Das, San Francisco, CA (US); Adnan Mohsin Habib, Tracy, CA (US)

(73) Assignee: Biz360 Inc., Palo Alto, CA (US)

( * ) Notice: Subject to any disclaimer, the term of this patent is extended or adjusted under 35 U.S.C. 154(b) by 1068 days.

(21) Appl. No.: 12/037,859

(22) Filed: Feb. 26, 2008

(65) Prior Publication Data
US 2009/0217208 A1 Aug. 27, 2009

(51) Int. Cl.
*G06F 3/00* (2006.01)
*G06F 17/30* (2006.01)

(52) U.S. Cl.
CPC ............................. *G06F 17/30864* (2013.01)
USPC .......................................... 715/760; 715/854

(58) Field of Classification Search
CPC .................................................. G06F 17/30864
USPC .................................................. 715/760, 854
See application file for complete search history.

(56) References Cited

U.S. PATENT DOCUMENTS

| | | | | |
|---|---|---|---|---|
| 6,278,992 B1 * | 8/2001 | Curtis et al. | .................. | 707/711 |
| 6,515,681 B1 * | 2/2003 | Knight | ........................... | 715/751 |
| 6,571,234 B1 * | 5/2003 | Knight et al. | ........................ | 1/1 |
| 6,778,982 B1 * | 8/2004 | Knight et al. | ................ | 707/737 |
| 6,804,675 B1 * | 10/2004 | Knight et al. | ................ | 707/754 |
| 6,859,807 B1 * | 2/2005 | Knight et al. | ........................ | 1/1 |
| 7,143,089 B2 * | 11/2006 | Petras et al. | .................. | 707/749 |
| 7,159,011 B1 * | 1/2007 | Knight et al. | ................ | 709/207 |
| 7,162,471 B1 * | 1/2007 | Knight et al. | ................ | 707/750 |
| 7,243,306 B1 * | 7/2007 | Joshi et al. | ..................... | 715/735 |
| 7,519,902 B1 * | 4/2009 | Kraft et al. | ..................... | 715/234 |
| 7,596,536 B2 * | 9/2009 | Tzruya et al. | ................... | 706/45 |
| 7,685,209 B1 * | 3/2010 | Norton et al. | ................ | 707/803 |
| 7,685,296 B2 * | 3/2010 | Brill et al. | ..................... | 709/228 |
| RE41,754 E * | 9/2010 | Knight | ........................ | 715/751 |
| 7,836,001 B2 | 11/2010 | Ducheneaut et al. | | |
| 8,117,207 B2 | 2/2012 | Mushtaq et al. | | |
| 8,280,980 B2 * | 10/2012 | Kasik et al. | .................... | 709/218 |
| 2002/0065802 A1 | 5/2002 | Uchiyama | | |
| 2002/0103820 A1 * | 8/2002 | Cartmell et al. | ............. | 707/500 |
| 2002/0129062 A1 * | 9/2002 | Luparello | ..................... | 707/513 |
| 2005/0060283 A1 * | 3/2005 | Petras et al. | ...................... | 707/1 |
| 2005/0091038 A1 | 4/2005 | Yi et al. | | |
| 2006/0136403 A1 * | 6/2006 | Koo | .................................. | 707/3 |
| 2007/0016563 A1 | 1/2007 | Omoigui | | |
| 2007/0078670 A1 | 4/2007 | Dave et al. | | |
| 2008/0028313 A1 * | 1/2008 | Ebert | ............................ | 715/730 |
| 2008/0059891 A1 * | 3/2008 | Herzog | ......................... | 715/751 |
| 2008/0098300 A1 * | 4/2008 | Corrales et al. | ............... | 715/243 |
| 2008/0244408 A1 * | 10/2008 | King et al. | ..................... | 715/719 |
| 2008/0244429 A1 * | 10/2008 | Stading | ......................... | 715/764 |
| 2008/0294996 A1 * | 11/2008 | Hunt et al. | ..................... | 715/739 |

\* cited by examiner

*Primary Examiner* — William Titcomb
(74) *Attorney, Agent, or Firm* — Sheppard, Mullin, Richter & Hampton LLP (57) ABSTRACT

A scraper system comprises a first scraper including a scraper manager for determining when to initiate content capture from a first website, the first website including content containing at least one end-user opinion corresponding to a category of interest; a navigation engine coupled to the scraper manager for navigating to the first website; a content capture engine coupled to the navigation engine for capturing the content on the first website; and a scraper database manager coupled to the content capture engine for controlling the storage of the captured content.

23 Claims, 7 Drawing Sheets

FIG. 5
(Example System)

SYSTEM AND METHOD FOR GATHERING PRODUCT, SERVICE, ENTITY AND/OR FEATURE OPINIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to marketing, customer service, product development, and more particularly provides a system and method for gathering product, service, entity and/or feature opinions.

BACKGROUND

Collecting end-user opinions on products, services, entities and/or features is an important way to inform a company of end-user satisfaction and improvement needs. Armed with end-user opinions, a company can achieve greater market penetration and develop future improvements.

Traditionally, product manufacturers and/or service providers provide paper surveys and/or contact users directly to request end-user opinions. These surveys often ask why an user purchased a product and/or service and about the user's initial opinions of the product, service, entity and/or features of the product and/or service. However, most end-users never complete the survey request or take the time to respond to the telephone inquiry.

With the development of online sales, much end-user opinion collection has gone online. Some companies provide online electronic surveys requesting end-user opinions. Electronic surveys are more convenient than paper surveys and less invasive than telephone calls. Although more users are willing to complete the electronic surveys, the significant majority of users still do not fill them out.

Websites unrelated to the original manufacturer and/or service provider have been developed that allow users to rate and review products, services, entities and/or features. Examples of such websites include Amazon.com and Edmunds.com. Users can navigate to a page corresponding to a particular product and/or service, and can rate the product, service, entity and/or features of the product and/or service. Other websites that provide end-user opinions of products, services, entities and/or features include blogs, message boards, auction sites, consumer review sites, expert sites, traditional media sites, etc. Accordingly, after an user has had an opportunity to evaluate a product and/or service, the user may be motivated to publish his or her opinions regarding the product, service, entity and/or features.

Accordingly, a company can read the comments of paper and electronic surveys received and read the published opinions corresponding to each of their products and/or services and to each of their competitor's products and/or services. Thus, the company can educate itself as to end-user opinions, how their products and/or services compare to their competitor's products and/or services, what features are liked or disliked, and what features may be desirable for future products, entities and/or services. However, mining for end-user opinions is a time consuming task.

Figure 1:
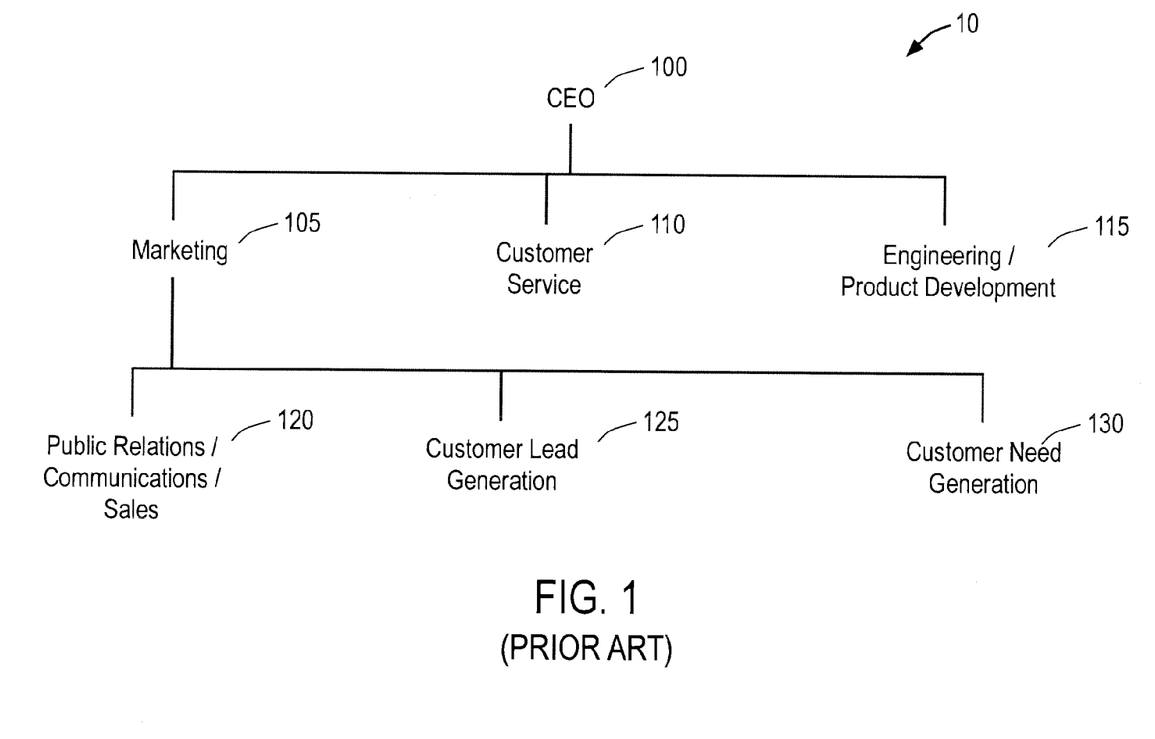
FIG. 1 is a block diagram of an example company structure in accordance with the prior art.

FIG. 1 is a block diagram of an example company 10. The example company 10 includes several entities at various positions in the corporate hierarchy. The example company 10 may include a CEO 100 who manages entities such as marketing 105, customer service 110, and engineering and product development 115. Marketing 105 may include additional entities such as public relations, communications and sales 120; customer lead generation 125; and customer need generation 130. Each of these entities may find the end-user opinions valuable. Accordingly, a system and method to assist with end-user opinion mining would be helpful.

SUMMARY

Per one embodiment, the present invention provides a scraper system comprising a first scraper including a scraper manager for determining when to initiate content capture from a first website, the first website including content containing at least one end-user opinion corresponding to a category of interest; a navigation engine coupled to the scraper manager for navigating to the first website; a content capture engine coupled to the navigation engine for capturing the content on the first website; and a scraper database manager coupled to the content capture engine for controlling the storage of the captured content.

For the system, scraper manager may be configured to initiate content capture according to a predetermined schedule. The content may include one or more of blog content, message board content, consumer review content, and traditional media content. The content capture engine may use one or more of an RSS feed, an API or HTML/HTTP capture to capture the content. The first scraper may include an indexer for indexing the captured content. The end-user opinion may include a rating of a product, service, entity or feature. The first scraper may include a rating normalizer that translates the rating to a predetermined scale. The rating may include a value within a first scale. The rating normalizer may translate the rating from the first scale to a second scale. The rating may include unstructured text, e.g., a descriptor and an intensifier. The rating normalizer may translate the unstructured text to a predetermined scale. The scraper system may include a second scraper for capturing content from a second website, the second website including content containing at least one other end-user opinion corresponding to the category of interest. Each of the first website and the second website may be assigned a website impact metric that defines its relative importance. The scraper manager may use the website impact metric of the first website to determine when to initiate content capture. The navigation engine may use a URL to navigate to the first website.

Per one embodiment, the present invention provides a scraper method comprising determining when to initiate content capture from a first website, the first website including content containing at least one end-user opinion corresponding to a category of interest; navigating to the first website; capturing the content from the first website; and storing the captured content.

For the method, the determining may include using a predetermined schedule. The content may include one or more of blog content, message board content, consumer review content, and traditional media content. The capturing may include using one or more of an RSS feed, an API or HTML/HTTP capture to capture the content. The scraper method may further comprise indexing the captured content. The end-user opinion may include a rating of a product, service, entity or feature. The scraper method may further comprise translating the rating to a predetermined scale. The rating may include a value within a first scale. The translating may include translating the rating from the first scale to a second scale. The rating may include unstructured text, e.g., a descriptor and an intensifier. The translating may include translating the unstructured text to a predetermined scale. The first website may include a website impact metric that defines its importance relative to other websites. The determining may use the website impact metric to determine when to initiate content capture. The navigating may include using a URL to navigate to the first website.

DETAILED DESCRIPTION

The following description is provided to enable any person skilled in the art to make and use the invention. Various modifications to the embodiments are possible, and the generic principles defined herein may be applied to these and other embodiments and applications without departing from the spirit and scope of the invention. Thus, the invention is not intended to be limited to the embodiments and applications shown, but is to be accorded the widest scope consistent with the principles, features and teachings disclosed herein.

Figure 2:
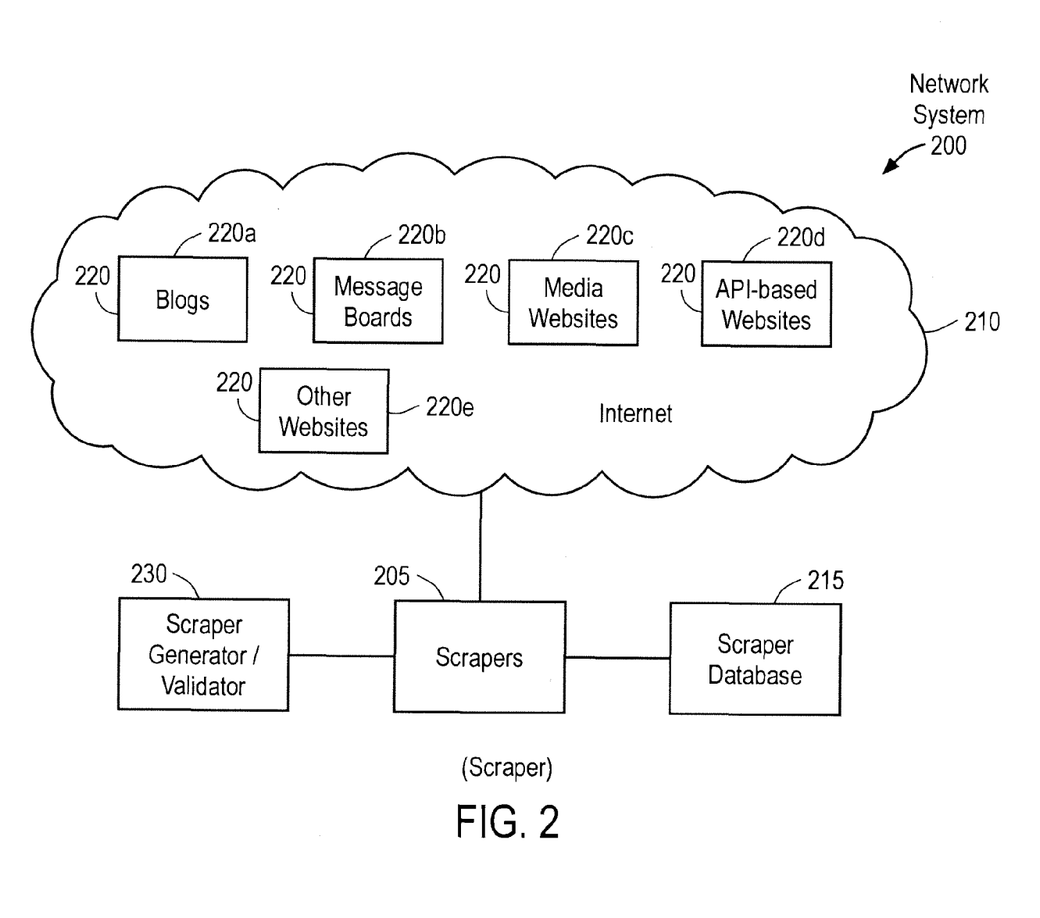
FIG. 2 is a block diagram a scraper network system, in accordance with an embodiment of the present invention.

FIG. 2 is a block diagram of a scraper network system 200, in accordance with an embodiment of the present invention. Scraper network system 200 includes scrapers 205 coupled to the wide-area network commonly referred to as the Internet 210, to a scraper database 215, and to a scraper generator/validator 230.

Figure 3:
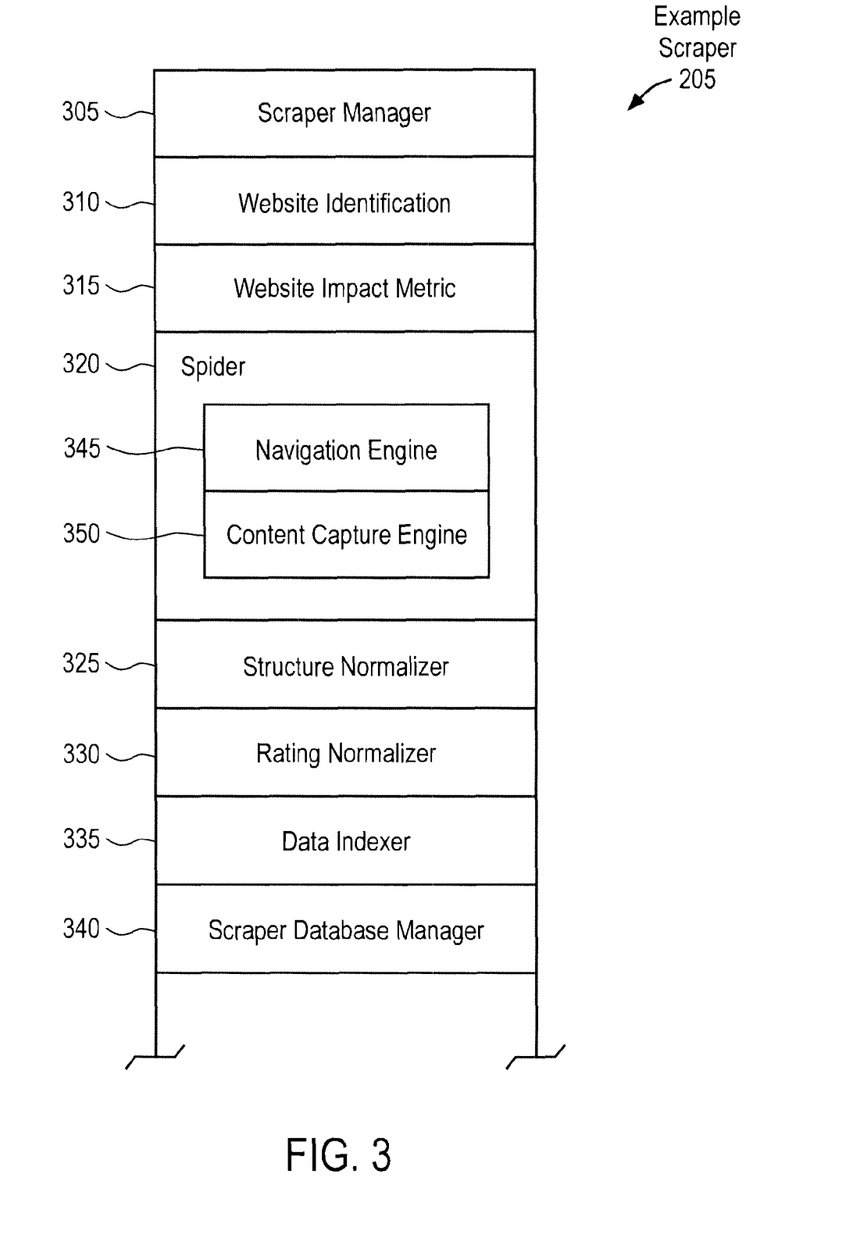
FIG. 3 is a block diagram of an example scraper, in accordance with an embodiment of the present invention.

In one embodiment, the scrapers 205 include hardware, software and/or firmware generally operative to navigate to and map one or more websites 220 on the Internet 210, to capture content therefrom, and to store the content in the scraper database 215. Example websites 220 may include blogs 220a, message boards 220b, media websites 220c, API-based websites 220d, and other websites 220e. The scrapers 205 may be configured to navigate only to websites 220 deemed important by an operator. In one embodiment, an operator may deem a website 220 "important" if it provides end-user opinions corresponding to a category of interest. Because websites include dynamic content, a website 220 may be important at times and unimportant at other times. Example categories of interest include automobiles, computers, cell phones, hotels/casinos/results, patent attorneys, plumbers, and/or the like. Categories may include product types, service types, and/or any other product and/or service grouping. Content may include end-user opinions regarding a product, service, entity and/or feature.

Because of the various types of websites, content may be presented as structured data, e.g., data within fields (rating information, product identifier, etc.), data having a predetermined format (author name, date, etc.), data placed at predetermined locations (title, URL, etc.), etc. Content may be presented as unstructured data, e.g., free-form text discussion of the product, service, entity and/or features or a combination of structured and unstructured data.

In one embodiment, the scrapers 205 may include a dedicated scraper 205 for each website 205. Accordingly, each scraper 205 may be configured to navigate to, map and capture content from its corresponding website 220 only. In another embodiment, a scraper 205 may be configured to navigate to, map and capture content from websites 220 that implement a predetermined protocol, e.g., RSS feed, API version, HTML/HTTP capture, etc. Details of an example scraper 205 are provided with reference to FIG. 3.

The scraper generator/validator 230 includes hardware, software and/or firmware operative to facilitate the generation and validation of a scraper 205. In one embodiment, generation of a scraper 300 includes generation and validation of proposed scraper code. Generation of proposed scraper code includes selection of a category of interest (e.g., automobiles), identification of websites 220 corresponding to the category of interest (e.g., AutoTrader.com, Edmunds.com, Epinions.com, TheCarBlog.com, etc.), assignment of impact metrics to each website 220, evaluation of page characteristics (e.g., format, geometry, structure, etc.) of a particular website 220, and generation of proposed scraper code from the navigation pattern and page characteristics of the particular website 220. Validation of the proposed scraper code may include syntactic review, semantic checking, and a test run of the proposed scraper code. If the scraper generator/validator 230 validates the proposed scraper code, then the scraper generator/validator 230 can initiate the proposed scraper code as a scraper 205. The generation and validation process repeats for each website 220.

FIG. 3 is a block diagram of an example scraper 205, in accordance with an embodiment of the present invention. Example scraper 205 includes a scraper manager 305, website identification 310, a website impact metric 315, a spider 320, a structure normalizer 325, a rating normalizer 330, a data indexer 335, and a scraper database manager 340. The example scraper 205 may be dedicated to a particular website 220 containing content corresponding to a particular category, e.g., dedicated to a message board website 220b containing content pertaining to automobiles. The example scraper 205 may be one of several scrapers 205 of a scraper group corresponding to the particular category. Further, there may be several scraper groups belonging to several categories.

The scraper manager 305 includes hardware, software and/or firmware operative to schedule content gathering from the Internet 210. The scraper manager 305 may initiate content gathering periodically (e.g., monthly, weekly, daily, etc.), at predetermined times (e.g., at 5 pm on the second Tuesday of the month), upon request (e.g., user initiation), after predetermined events (e.g., an update to one or more websites, the end of a pay period, etc.), etc. In one embodiment, the scraper manager 305 schedules content gathering based on the content type, e.g., based on whether the content is consumer blog content, consumer message board content, consumer review website content, expert blog content, expert message board content, expert review website content, etc. For example, if the content type is blog content, the scraper manager 305 may gather the data daily. If the content type is message board content, then the scraper manager 305 may gather the data weekly, e.g., after a thread of content has likely been thoroughly discussed. In one embodiment, the scraper manager 305 schedules content gathering based on its website impact metric 315. For example, if the website impact metric 315 is high, then the scraper manager 305 may gather the data daily. If the website impact metric 315 is low, then the scraper manager 305 may gather the data weekly. In one embodiment, sliding scales are possible. In yet another embodiment, the scraper manager 305 continually captures content from the various websites 220, possibly in a sequence among the websites 220 deemed important.

The website identification 310 includes the URL of the website 220.

The website impact metric 315 includes a value indicative of the importance of a website 220 as it pertains to the evaluation of end-user opinions. For example, one website 220. e.g., ConsumerReports.com, may be granted more value than one person's blog. The website impact metric 315 may be used for various purposes, such as scheduling, rating valuation, rating normalization, etc. In one embodiment, the scraper manager 305 may only scrape websites 220 that have a website impact metric over a particular level. In one embodiment, the user may select the minimum website impact metric to include in the results.

The spider 320 includes hardware, software and/or firmware operative to navigate to the website 220, to map the pages and sub-pages of the website 220, and to capture content therefrom. The spider 320 includes a navigation engine 345 and a content capture engine 350.

The navigation engine 345 is operative to navigate to the website 220 (e.g., to the homepage and/or sub-page on the website 220), and to map the "tree" structure of the website 220 before content capture. The navigation engine 345 may include navigation mechanism to follow links on a home page or higher-level page to sub-pages containing content. For example, in one embodiment, the navigation engine 345 is operative to navigate to the home page of a particular website 220 based on the website identification 310. The navigation engine 345 may follow hyperlinks from the particular website 220 to the sub-pages. The navigation engine 345 may capture the URLs of the sub-pages containing the content to scrape. In one embodiment, the navigation engine 345 may store the URLs of the sub-pages to jump to the particular sub-pages for content capture.

The content capture engine 350 is operative to capture the content from the pages (and sub-pages) of the website 220. The content capture engine 350 may be capable of capturing data of one or more protocols, e.g., RSS feeds, API-based communication, HTML/HTTP capture, and/or other data capture protocol. The content capture engine 350 may cooperate with the navigation engine 345 to jump between sub-pages identified for content capture.

The content capture engine 350 may use content-identification mechanisms (e.g., content-location on a sub-page) and/or rules-based mechanisms (e.g., syntactic and/or semantic engines) to identify the content to capture. The content capture engine 350 may be configured to capture both structured data (such as author name, date, rating information, etc.) and unstructured data (such as free text of all end-user).

The structure normalizer 325 includes hardware, software and/or firmware operative to receive the structured data and to normalize the data to a predetermined format (such as <Last Name, First Name, Middle Initial if available>, <Month Day, Year>, etc.).

The rating normalizer 330 includes hardware, software and/or firmware operative to receive ratings information and to normalize the ratings to a predetermined scale. For example, some websites 220 may request specific rating information for a product, service, entity and/or feature. However, the scale and/or format may be different. One website 220 may grade a product, service, entity and/or feature on a 100-point scale. Another website 220 may grade a product, service, entity and/or feature oil a A-F scale. Yet another website 220 may grade a product, service, entity and/or feature according to a set of descriptors, e.g., Excellent, Good, Average, Poor, etc. The rating normalizer 330 translates the rating information from the website's scale to a common scale, e.g., 1-10. In yet another embodiment, the end-user may use unstructured text to describe an opinion relative to the product, service, entity and/or feature. The rating normalizer 330 may be configured to apply semantic analysis to translate the free-form text to the common scale. For example, if the end-user states "the comfort of a car was mediocre," then the rating normalizer 330 may translate the descriptor "mediocre" to level 5 of 10.

In one embodiment, the rating normalizer 330 includes hardware, software and/or firmware to evaluate rating modifiers, such as intensifiers (e.g., "incredibly," "very" etc.) which intensify a rating, minimizers (e.g., "marginally," "kinda," "somewhat," etc.) which reduce a rating, negators (e.g., "not," "nor," "neither," etc.) that reverse a rating, and polarizers (e.g., "big cockroach" with reference to hotels, "tasty chicken" with reference to restaurants, etc.) that can affect a rating.

The rating normalizer 330 may use the presence of a rating modifier to modify rating. For example, the rating normalizer 330 may normalize the rating "excellent" as a 10/10. However, the rating normalizer 330 may treat the presence of the term "almost" as in "almost excellent" by dropping the rating by two points, in this case, to 8/10. Similarly, if the rating normalizer 330 treated the term "good" as a 6/10, the rating normalizer 330 may raise a rating by two points if it recognizes the term "very." In another embodiment, the rating normalizer 330 translates the rating/modifier combination to the predetermined scale. For example, the rating normalizer 330 may treat the combined term "not good" as a 3/10, regardless of how the rating normalizer 330 would treat the term "good."

In one embodiment, the rating normalizer 330 includes a database of polarizer/category combinations corresponding to rating values and/or rating modifiers. The rating normalizer may use a polarizer/category combination to modify the rating or cause a different translation. For example, the rating normalizer 330 may rate the language "excellent restaurant but for a big cockroach" lower than "excellent restaurant," and maybe even lower than "good restaurant." Due to the presence of a polarizer/category combination, the rating normalizer 330 may modify the rating by a certain number of points (e.g., from 10/10 to 8/10) or may translate the language directly to its predetermined scale (e.g., directly to 8/10).

The data indexer 335 includes hardware, software and/or firmware operative to index the captured content, e.g., full-text index in a similar manner as applied by convention search engines such as Yahoo! and/or Google. For example, the data indexer 335 may generate a reverse index of terms of the captured content so that the content can more easily be searched and relevant content can more easily be identified.

The scraper database manager 340 includes hardware, software and/or firmware operative to store the captured, normalized, indexed content into the scraper database 215. In one embodiment, the scraper database manager 340 may use any of a variety of protocols, including SQL.

Figure 4:
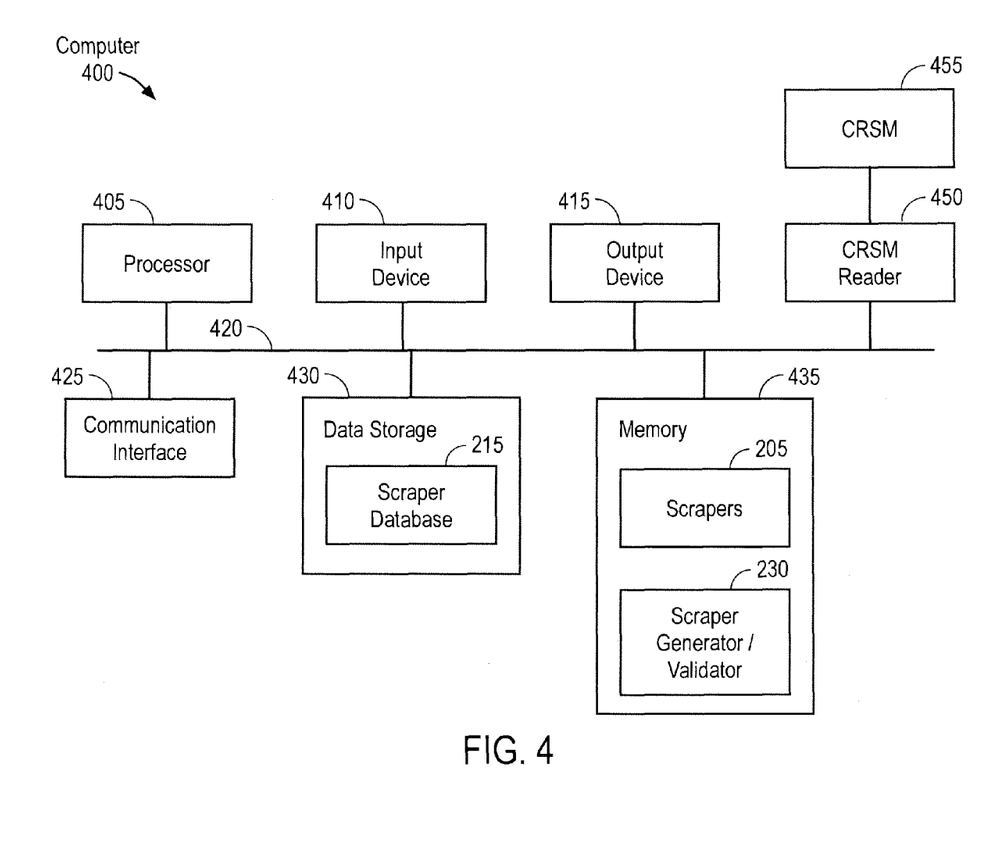
FIG. 4 is a block diagram of a scraper computer system, in accordance with an embodiment of the present invention.

FIG. 4 is a block diagram of a scraper computer system 400, in accordance with an embodiment of the present invention. Scraper computer system 400 includes a processor 405, such as an Intel Pentium® microprocessor or a Motorola Power PC® microprocessor, coupled to a communications channel 420. The scraper computer system 400 further includes an input device 410 such as a keyboard or mouse, an output device 415 such as a cathode ray tube display, a communications device 425, a data storage device 430 such as a magnetic disk, and memory 435 such as Random-Access Memory (RAM), each coupled to the communications channel 420. The communications interface 425 may be coupled to the Internet 210. One skilled in the art will recognize that, although the data storage device 430 and memory 435 are illustrated as different units, the data storage device 430 and memory 435 can be parts of the same unit, distributed units, virtual memory, etc. Further, it will be appreciated that the term "memory" herein is intended to cover all data storage media whether permanent or temporary.

As shown, the data storage device 430 stores the scraper database 215, and the memory 435 stores the scrapers 205 and the scraper generator/validator 230. The data storage device 430 and/or the memory 435 may also store an operating system (not shown) such as the Microsoft Windows XP, Linux, the IBM OS/2 operating system, the MAC OS, or UNIX operating system. It will be appreciated that a preferred embodiment may also be implemented on platforms and operating systems other than those mentioned. An embodiment may be written using JAVA, C, and/or C++ language, or other programming languages, possibly using object oriented programming methodology.

One skilled in the art will recognize that the scraper computer system 400 may also include additional components, such as network connections, additional memory, additional processors, LANs, input/output lines for transferring information across a hardware channel, the Internet or an intranet, etc. One skilled in the art will also recognize that the programs and data may be received by and stored in the system in alternative ways. For example, a computer-readable storage medium (CRSM) reader 450 such as a magnetic disk drive, hard disk drive, magneto-optical reader, CPU, etc. may be coupled to the communications channel 420 for reading a computer-readable storage medium (CRSM) 455 such as a magnetic disk, a hard disk, a magneto-optical disk, RAM, etc. Accordingly, the scraper computer system 400 may receive programs and/or data via the CRSM reader 450.

Figure 5:
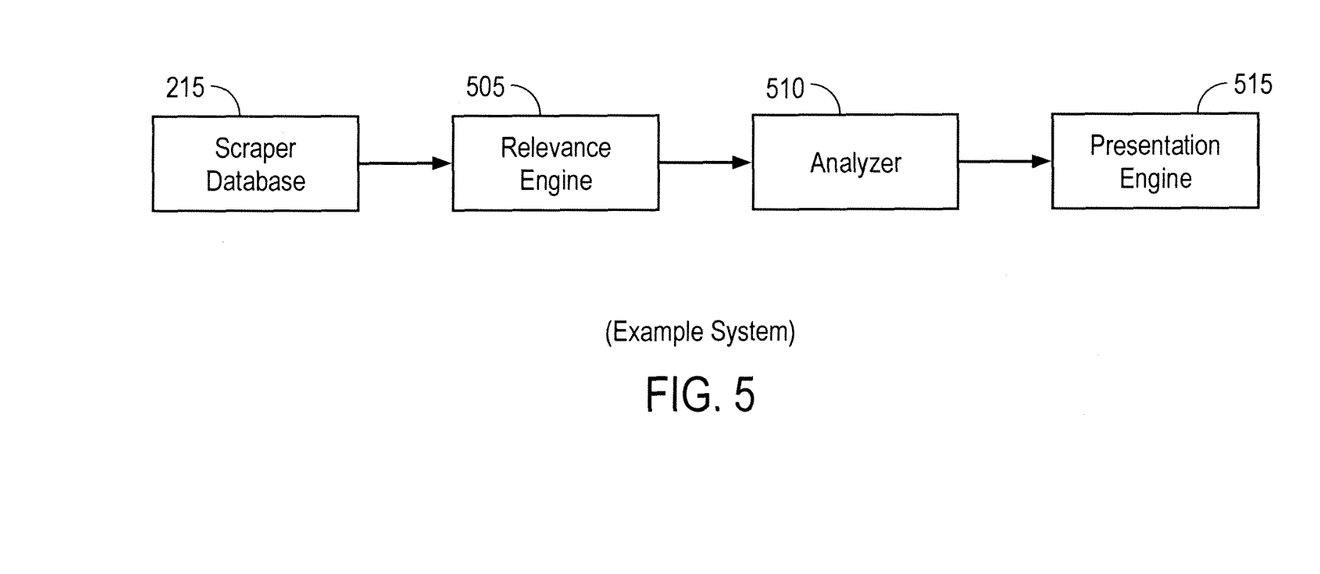
FIG. 5 is a block diagram of an example scraper context, in accordance with an embodiment of the present invention.

FIG. 5 is a block diagram of an example scraper context 500, in accordance with an embodiment of the present invention. Example scraper context 500 includes the scraper database 215, coupled to a relevance engine 505, in turn coupled to an analyzer 510, and in turn coupled to a presentation engine 515.

In one embodiment, the relevance engine 505 includes hardware, software and/or firmware operative to extract unstructured text and to use proximity and statistical models to map opinions to products, services, entities and/or features. The relevance engine 505 may also identify opinions unmappable to products, services, entities and/or features. The relevance engine 505 may conduct a similar analysis on structured text.

In one embodiment, the analyzer 510 includes hardware, software and/or firmware operative to decompose blocks of text, e.g., sentences, of the unstructured mapped text into language structures, and to determine candidate product/service/feature-opinion pairs ("Toyota Prius"—"Excellent"; "gas mileage in Toyota Prius"—"Excellent", "seat size in Lexus"—"Excellent"; "gas mileage in Lexus"—"Mediocre"). In one embodiment, the analyzer 510 may be configured to ignore absurd or unsophisticated sentiments, e.g., "the car is salty." Accordingly, a predetermined dictionary of products, services and features corresponding to appropriate terms may be used.

The analyzer 510 may abstract attributes based on feature opinions. It will be appreciated that the term "attribute" may be used to identify a broad feature (e.g., comfort, etc.) that involves multiple specific features (e.g., seat size, lumbar support, cabin height, etc.). Thus, the analyzer 510 may abstract comments about seat size (a feature) and lumbar support (another feature) to determine overall comfort (an attribute). The analyzer 510 may be configured to aggregate sentiments per product/service, per feature, per time period, per brand, etc.

Figure 6:
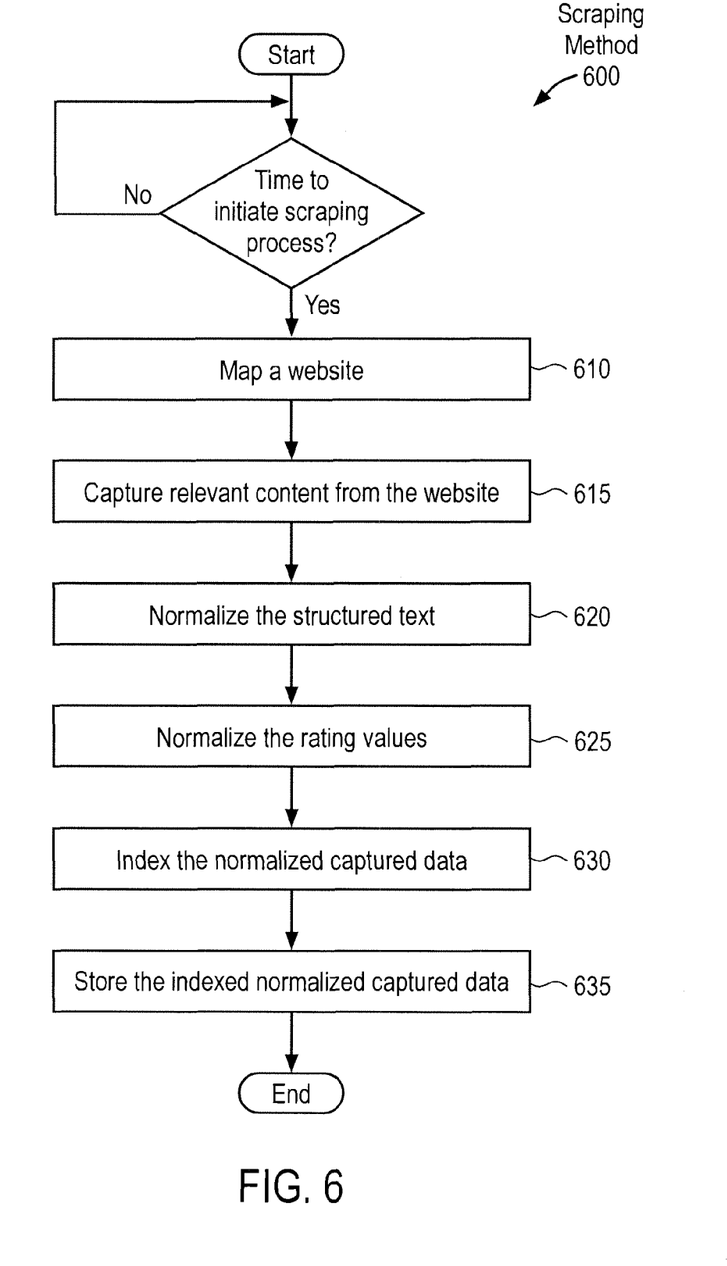
FIG. 6 is a flowchart of a method of scraping, in accordance with an embodiment of the present invention.

FIG. 6 is a flowchart of a method 600 of scraping, in accordance with an embodiment of the present invention. Method 600 begins with the scraper manager 305 in step 605 determining whether to initiate a scraping process. The scraper manager 305 may look to the expiration of a time period, the occurrence of an event, a particular date and/or time, and/or the like. The scraper manager 305 may also use the website impact metric to effect when to initiate a scraping process. If the scraper manager 305 determines that it is not time to initiate a scraping, then the method 600 returns to step 605. Otherwise, the method 600 proceeds to step 610.

In step 610, the navigation engine 345 of the spider 320 navigates to the website 220 and generates a map of the sub-pages on the website 220. The navigation engine 345 may be configured to map all pages or map only pages with predefined format or geometry. The navigation engine 345 may be configured to perform semantic and/or syntax analysis to identify pages for content capture. After the navigation engine 345 has identified pages of the website 220 for content capture, the content capture engine 350 of the spider 320 in step 615 captures the content from the website 220. The content may include structured data (e.g., title, rating information, author name, etc.) and unstructured data (e.g., free-form text that discusses a product, service, entity and/or feature). The structure normalizer 325 in step 620 normalizes the structured data, e.g., the format of the name, the format of the date, etc. The rating normalizer 330 in step 625 normalizes rating information, which may be presented as structured data, e.g., a rating value presented in a single field, and/or unstructured data, e.g., free-form text including one or more descriptors and/or intensifiers of a feature. The rating normalizer 330 may translate the structured and/or unstructured rating information to a predetermined scale, e.g., 1-10. The data indexer 335 in step 630 indexes the normalized captured content. The scraper database manager 340 in step 635 stores the indexed normalized captured content in the scraper database 215. Method 600 then ends.

Figure 7:
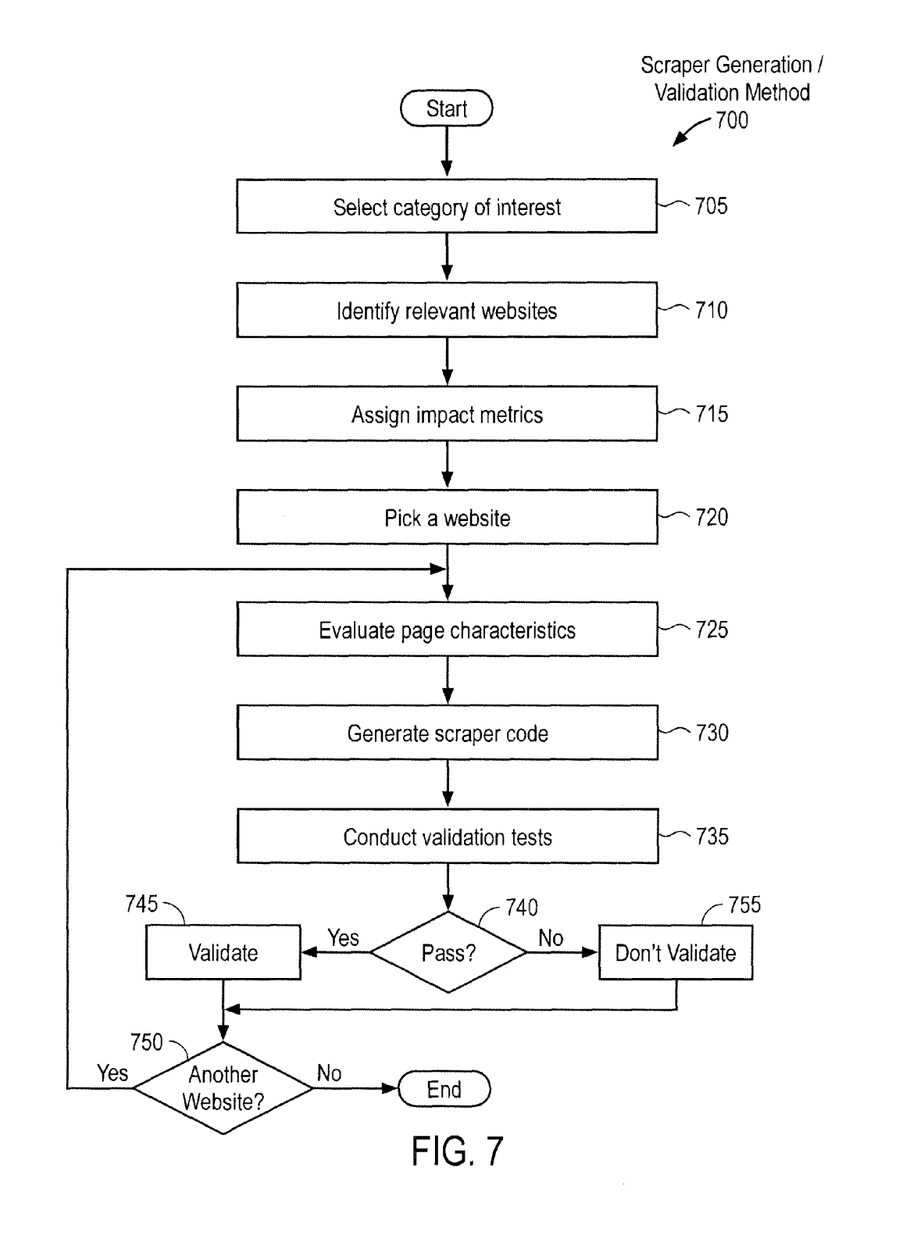
FIG. 7 is a flowchart of a method of generating/validating a scraper, in accordance with an embodiment of the present invention.

FIG. 7 is a flowchart of a method 700 of generating/validating a scraper 205, in accordance with an embodiment of the present invention. The method 700 begins with the scraper generator/validator 230 in step 705 selecting a category of interest (e.g., automobiles). The scraper generator/validator 230 in step 710 identifies websites 220 corresponding to the category of interest (AutoTrader.com, Edmunds.com, Epinions.com, TheCarBlog.com, etc.). The scraper generator/validator 230 in step 715, possibly in coordination with an operator, assigns impact metrics to each website 220.

The scraper generator/validator 230, possibly in cooperation with an operator, in step 720 identifies a website 220 and in step 725 evaluates page characteristics of various sub-pages containing content to be scraped. The scraper generator/validator 230 in step 730 generates proposed scraper code that uses the navigation patterns and/or page characteristics for the particular website 220, the proposed scraper code being operative to control content capture. The scraper generator/validator 230 in step 735 conducts validation tests, possibly including syntactic review, semantic checking, and a test run of the proposed scraper code. The scraper generator/validator 230 in step 740 determines whether the proposed scraper code passes the validation test. If the code passes, then the scraper generator/validator 230 in step 745 validates the proposed scraper code, which may include initiating the proposed scraper code as a scraper 205. The method 700 then proceeds to step 750. If the code fails, then the scraper generator/validator 230 in step 755 does not validate the code. The method 700 then proceeds to step 750.

In step 750, the scraper generator/validator 230 determines if there is another website 220 for scraper generation. If so, then method 700 returns to step 725. Otherwise, method 700 then ends.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

The invention claimed is:

1. A scraper system comprising:
    a first scraper including:
        a scraper manager for determining an automated schedule to initiate content capture from a first website, the first website including content containing at least one end-user opinion corresponding to a category of interest, the first website being associated with a first website impact metric defining a first importance of the first website and including a first value indicating the first importance of the first website related to evaluating end-user opinions, the automated schedule being dependent on the first website impact metric associated with the first website;
        a navigation engine coupled to the scraper manager for navigating to the first website;
        a content capture engine coupled to the navigation engine for capturing the content from the first website; and
        a scraper database manager coupled to the content capture engine for controlling storage of the captured content.

2. The scraper system of claim 1, wherein the scraper manager is configured to initiate content capture from the first website according to a predetermined schedule.

3. The scraper system of claim 1, wherein the content includes one or more of blog content, message board content, consumer review content, and traditional media content.

4. The scraper system of claim 1, wherein the content capture engine uses one or more of an RSS feed, an API, or HTML/HTTP capture to capture the content.

5. The scraper system of claim 1, wherein the first scraper includes an indexer for indexing the captured content.

6. The scraper system of claim 1, wherein the end-user opinion includes a rating of a product, service, entity or feature, and the first scraper includes a rating normalizer that translates the rating to a predetermined scale.

7. The scraper system of claim 6, wherein the rating includes a rating value within a first scale, and the rating normalizer translates the rating from the first scale to a second scale.

8. The scraper system of claim 6, wherein the rating includes unstructured text, and wherein the rating normalizer translates the unstructured text to the predetermined scale.

9. The scraper system of claim 8, wherein the unstructured text includes a descriptor and an intensifier, minimizer, negator, or polarizer.

10. The scraper system of claim 1, wherein the scraper system includes a second scraper for capturing content from a second website, the second website including content containing at least one other end-user opinion corresponding to the category of interest.

11. The scraper system of claim 10, wherein the second website is associated with a second website impact metric defining a second importance of the second website and including a second value indicating the second importance of the second website related to evaluating end-user opinions.

12. The scraper system of claim 11, wherein the scraper manager uses the first website impact metric and the second website impact metric to determine the automated schedule to initiate content capture from the first website and the second website.

13. A scraper method comprising:
    determining an automated schedule to initiate content capture from a website, the website including content containing at least one end-user opinion corresponding to a category of interest, the website being associated with a website impact metric defining an importance of the website and including a value indicating the importance of the website related to evaluating end-user opinions, the automated schedule being dependent on the website impact metric associated with the website;
    navigating to the website;
    capturing the content from the website; and
    storing the captured content.

14. The scraper method of claim 13, wherein the determining includes using a predetermined schedule.

15. The scraper method of claim 13, wherein the content includes one or more of blog content, message board content, consumer review content, and traditional media content.

16. The scraper method of claim 13, wherein the capturing includes using one or more of an RSS feed, an API, or HTML/HTTP capture to capture the content.

17. The scraper method of claim 13, further comprising indexing the captured content.

18. The scraper method of claim 13, wherein the end-user opinion includes a rating of a product, service, entity or feature, and further comprising translating the rating to a predetermined scale.

19. The scraper method of claim 18, wherein the rating includes a rating value within a first scale, and wherein the translating includes translating the rating from the first scale to a second scale.

20. The scraper method of claim 18, wherein the rating includes unstructured text, and wherein the translating includes translating the unstructured text to the predetermined scale.

21. The scraper method of claim 20, wherein the unstructured text includes a descriptor and an intensifier, minimizer, negator, or polarizer.

22. The scraper method of claim 13, wherein the website impact metric defines the importance of the website relative to other websites.

23. The scraper method of claim 22, wherein the determining uses the website impact metric to determine the automated schedule to initiate content capture.

* * * * *